US006120877A

United States Patent [19]

Deno et al.

[11] Patent Number: 6,120,877

[45] Date of Patent: Sep. 19, 2000

[54] MAGNETIC RECORDING MEDIUM

[75] Inventors: Takayuki Deno; Kazuo Shishime, both of Ibaraki-ken, Japan

[73] Assignee: Victor Company of Japan, Limited, Kanagawa-ken, Japan

[21] Appl. No.: 09/293,124

[22] Filed: Apr. 16, 1999

[30] Foreign Application Priority Data

Apr. 28, 1998 [JP] Japan .................................. 10-134479
Sep. 14, 1998 [JP] Japan .................................. 10-260444

[51] Int. Cl.[7] .................................................... G11B 5/708

[52] U.S. Cl. .......................... 428/141; 428/328; 428/336; 428/694 BN; 428/694 BR; 428/900

[58] Field of Search .................................... 428/141, 328, 428/336, 694 BN, 694 BR, 900

[56] References Cited

U.S. PATENT DOCUMENTS 5,718,964 2/1998 Naoe et al. ............................. 428/141
6,007,896 12/1999 Bitushan ................................. 428/141
6,017,605 1/2000 Yamazaki ............................... 428/65.3

FOREIGN PATENT DOCUMENTS

P60-93631 5/1985 Japan .
P61-57036 3/1986 Japan .
P6-52541 2/1994 Japan .
P8-235569 9/1996 Japan .
P9-32540 2/1997 Japan .
P9-115130 5/1997 Japan .

*Primary Examiner*—Stevan A. Resan
*Attorney, Agent, or Firm*—Nath & Associates; Gary M. Nath; Harold L. Novick

[57] ABSTRACT

A disclosed magnetic recording medium is provided with a single magnetic layer coated on one surface of a non-magnetic substrate. The magnetic layer has a thickness of not less than 2 $\mu$m, protrusions on a plane of a height of 10 nm from a center plane in measurement of surface roughness of the magnetic layer with a density of 5000 to 9000 protrusions/mm$^2$ and protrusions on a plane of a height of 30 nm from the center plane with a density of 500 to 2000 protrusions/mm$^2$.

4 Claims, 5 Drawing Sheets

FIG.1

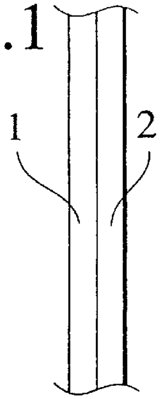

FIG.2

| SAMPLE | FEATURE | PROTRUSION DENSITIES ON PLANES WITH RESPECTIVE HEIGHTS: 10 nm PROTRUSION DENSITY (PROTRUSIONS/mm2) | PROTRUSION DENSITIES ON PLANES WITH RESPECTIVE HEIGHTS: 30 nm PROTRUSION DENSITY (PROTRUSIONS/mm2) | 6.5 MHz OUTPUT: CARRIER OUTPUT (dB) | 6.5 MHz OUTPUT: C/N (dB) | CONTAMINATION OF HEAD SLIDING SURFACE | HEAD CLOGGING RECOVERY TIME (min) | ABRASION LOSS OF HEAD (μm) | DYNAMIC FRICTION COEFFICIENT (MAGNETIC LAYER) | 500 PATH RUNNING ΔD/O (NUMBERS/min) |
|---|---|---|---|---|---|---|---|---|---|---|
| EXAMPLE 1 | REFERENCE SAMPLE | 6600 | 800 | 0.5 | 0.8 | ◎ | 3 | 3 | 0.25 | 40 |
| EXAMPLE 2 | HIGH N10 AND HIGH N30 | 8300 | 1100 | 0.3 | 0.5 | ◎ | 2 | 7 | 0.23 | 35 |
| EXAMPLE 3 | HIGH N30 | 7100 | 1800 | 0 | 0.1 | ○ | 2 | 4 | 0.22 | 30 |
| EXAMPLE 4 | LOW N10 | 5200 | 800 | 0.6 | 0.8 | ○ | 8 | 2 | 0.26 | 45 |
| EXAMPLE 5 | QUANTITY OF ABRASIVE MATERIAL IS REDUCED | 6600 | 910 | 0.7 | 1.0 | ◎ | 3 | 4 | 0.25 | 60 |
| EXAMPLE 6 | QUANTITY OF ABRASIVE MATERIAL IS INCREASED | 6800 | 1000 | -0.5 | -0.1 | ◎ | 1 | 7 | 0.23 | 35 |
| EXAMPLE 7 | ABRASIVE MATERIAL $Cr_2O_3$ | 6500 | 950 | 0.6 | 0.7 | ◎ | 3 | 3 | 0.24 | 35 |
| EXAMPLE 8 | LOW Hc | 7000 | 800 | -1 | -1.1 | ◎ | 3 | 3 | 0.25 | 40 |
| EXAMPLE 9 | SHORT MAJOR AXIS LENGTH | 7000 | 600 | 0.3 | 1.0 | ○ | 5 | 3 | 0.26 | 80 |
| EXAMPLE 10 | LONG MAJOR AXIS LENGTH | 6500 | 1500 | 0 | -1.0 | ◎ | 2 | 6 | 0.24 | 40 |

| SAMPLE | FEATURE | PROTRUSION DENSITIES ON PLANES WITH RESPECTIVE HEIGHTS | | 6.5 MHz OUTPUT | | CONTAMINATION OF HEAD SLIDING SURFACE | HEAD CLOGGING RECOVERY TIME (min) | ABRASION LOSS OF HEAD (μm) | DYNAMIC FRICTION COEFFICIENT (MAGNETIC LAYER) | 500 PATH RUNNING ΔD/O (NUMBERS/min) |
|---|---|---|---|---|---|---|---|---|---|---|
| | | 10 nm PROTRUSION DENSITY (PROTRUSIONS/mm²) | 30 nm PROTRUSION DENSITY (PROTRUSIONS/mm²) | CARRIER OUTPUT (dB) | C/N (dB) | | | | | |
| COMPARATIVE EXAMPLE 1 | HIGH N30 | 7000 | 3000 | -1.5 | -2.5 | △ | 2 | 5 | 0.22 | 35 |
| COMPARATIVE EXAMPLE 2 | HIGH N10 | 10000 | 900 | 0.5 | 0.4 | ◎ | 1 | 23 | 0.23 | 40 |
| COMPARATIVE EXAMPLE 3 | LOW N10 AND LOW N30 | 4300 | 200 | 1 | 0.9 | × | NO RECOVERY | 3 | 0.35 | 700 |
| COMPARATIVE EXAMPLE 4 | LOW N10 | 3200 | 1100 | -0.5 | -1.0 | × | 60 | 3 | 0.27 | 80 |
| COMPARATIVE EXAMPLE 5 | LOW N30 | 7000 | 300 | 0.5 | 0.9 | ◎ | NO RECOVERY | 7 | 0.34 | 650 |
| COMPARATIVE EXAMPLE 6 | LOW N10 AND HIGH N30 | 3500 | 2200 | -1.5 | -3.0 | △ | 40 | 5 | 0.25 | 45 |
| COMPARATIVE EXAMPLE 7 | QUANTITY OF ABRASIVE MATERIAL IS INCREASED | 6600 | 1300 | -2 | -1.5 | ◎ | 1 | 20 | 0.22 | 35 |
| COMPARATIVE EXAMPLE 8 | QUANTITY OF ABRASIVE MATERIAL IS REDUCED | 7000 | 800 | 1 | 1.2 | ○ | 10 | 3 | 0.26 | 650 |
| COMPARATIVE EXAMPLE 9 | LONG MAJOR AXIS LENGTH LOW N10 AND HIGH N30 | 3500 | 2200 | -2.8 | -3.5 | △ | 50 | 4 | 0.24 | 40 |

| SAMPLE | FEATURE | PROTRUSION DENSITIES ON PLANES WITH RESPECTIVE HEIGHTS: 10 nm PROTRUSION DENSITY (PROTRUSIONS/mm$^2$) | PROTRUSION DENSITIES ON PLANES WITH RESPECTIVE HEIGHTS: 30 nm PROTRUSION DENSITY (PROTRUSIONS/mm$^2$) | 6.5 MHz OUTPUT: CARRIER OUTPUT (dB) | 6.5 MHz OUTPUT: C/N (dB) | HEAD CLOGGING RECOVERY TIME (min) | ABRASION LOSS OF HEAD ($\mu$m) | LINEAR ABSORPTION COEFFICIENT ($\mu$m$^{-1}$) | 500 PATH RUNNING EDGE DAMAGE |
|---|---|---|---|---|---|---|---|---|---|
| EXAMPLE 11 | REFERENCE SAMPLE | 6600 | 800 | 0.5 | 0.8 | 3 | 3 | 2.5 | ◎ |
| EXAMPLE 12 | QUANTITY OF $CrO_2$ IS REDUCED | 5900 | 700 | 0.7 | 1.0 | 5 | 3 | 2.3 | ○ |
| EXAMPLE 13 | QUANTITY OF $CrO_2$ IS INCREASED | 8000 | 1100 | 0.1 | 0.6 | 1 | 6 | 3.3 | ◎ |
| EXAMPLE 14 | QUANTITY OF ABRASIVE MATERIAL IS REDUCED | 6600 | 910 | 0.7 | 1.0 | 10 | 2 | 2.7 | ◎ |
| EXAMPLE 15 | QUANTITY OF ABRASIVE MATERIAL IS INCREASED | 6900 | 1200 | -0.3 | 0.1 | 1 | 7 | 2.3 | ◎ |
| EXAMPLE 16 | ABRASIVE MATERIAL $Cr_2O_3$ | 6800 | 950 | 0.4 | 0.4 | 3 | 3 | 2.6 | ◎ |
| EXAMPLE 17 | HIGH Hc | 6600 | 800 | 0.9 | 1.2 | 3 | 3 | 2.5 | ◎ |
| EXAMPLE 18 | LOW Hc | 6600 | 800 | 0.1 | 0.5 | 3 | 3 | 2.5 | ◎ |
| EXAMPLE 19 | LONG MAJOR AXIS LENGTH | 6800 | 1300 | 0.2 | -0.1 | 1 | 4 | 2.6 | ◎ |
| EXAMPLE 20 | SHORT MAJOR AXIS LENGTH | 7200 | 900 | 0.5 | 0.9 | 3 | 3 | 2.4 | ○ |

| SAMPLE | FEATURE | PROTRUSION DENSITIES ON PLANES WITH RESPECTIVE HEIGHTS: 10 nm PROTRUSION DENSITY (PROTRUSIONS/mm²) | PROTRUSION DENSITIES ON PLANES WITH RESPECTIVE HEIGHTS: 30 nm PROTRUSION DENSITY (PROTRUSIONS/mm²) | 6.5 MHz OUTPUT: CARRIER OUTPUT (dB) | 6.5 MHz OUTPUT: C/N (dB) | HEAD CLOGGING RECOVERY TIME (min) | ABRASION LOSS OF HEAD (μm) | LINEAR ABSORPTION COEFFICIENT (μm⁻¹) | 500 PATH RUNNING EDGE DAMAGE |
|---|---|---|---|---|---|---|---|---|---|
| COMPARATIVE EXAMPLE 10 | HIGH N30 | 6500 | 3300 | -1.5 | -2.5 | 1 | 5 | 2.5 | ◎ |
| COMPARATIVE EXAMPLE 11 | HIGH N10 | 11000 | 1000 | 0.5 | 0.6 | 3 | 12 | 2.5 | ◎ |
| COMPARATIVE EXAMPLE 12 | LOW N10 AND HIGH N30 | 3300 | 300 | 0.7 | 1.2 | NO RECOVERY | 1 | 2.5 | △ |
| COMPARATIVE EXAMPLE 13 | QUANTITY OF ABRASIVE MATERIAL IS INCREASED | 7000 | 800 | 1.0 | 1.2 | 15 | 1 | 2.7 | △ |
| COMPARATIVE EXAMPLE 14 | QUANTITY OF ABRASIVE MATERIAL IS REDUCED | 6600 | 1300 | -2.0 | -1.4 | 1 | 20 | 2 | △ |
| COMPARATIVE EXAMPLE 15 | LOW Hc | 6600 | 800 | -1.8 | -0.9 | 3 | 3 | 2.5 | ◎ |
| COMPARATIVE EXAMPLE 16 | LOW Hc AND LONG MAJOR AXIS LENGTH | 6500 | 2200 | -1.0 | -2.0 | 1 | 3 | 2.6 | ◎ |
| COMPARATIVE EXAMPLE 17 | LOW Hc AND SHORT MAJOR AXIS LENGTH | 6500 | 900 | 0.8 | 1.2 | 25 | 2 | 2.3 | × |
| COMPARATIVE EXAMPLE 18 | QUANTITY OF $CrO_2$ IS INCREASED | 7500 | 2300 | -1.5 | -1.0 | 2 | 5 | 3.6 | △ |
| COMPARATIVE EXAMPLE 19 | NO $CrO_2$ ADDED | 6600 | 800 | 0.5 | 0.8 | 3 | 3 | 1.9 | × |
| COMPARATIVE EXAMPLE 20 | NO $CrO_2$ ADDED | 7000 | 3000 | -1.5 | -2.5 | 2 | 5 | 1.9 | × |
| COMPARATIVE EXAMPLE 21 | NO $CrO_2$ ADDED | 10000 | 300 | 0.7 | 1.0 | NO RECOVERY | 10 | 1.9 | × |

FIG.6

MAGNETIC RECORDING MEDIUM

BACKGROUND OF THE INVENTION

1. Field of the Invention

The present invention relates to a magnetic recording medium and relates to, in particular, a coated type magnetic recording medium on which a magnetic layer is coated.

2. Description of the Related Art

Recently, a high-density, long-time recording is demanded with respect to a magnetic recording medium in which a magnetic layer having magnetic fine powder dispersed in a binder is coated on a non-magnetic substrate.

To realize the high-density recording, it is required to smooth the surface of the magnetic layer to thereby increase carrier output and to decrease noise. To realize the long-time recording, it is required to make a tape as the substrate thinner.

Further, as the mass consumption of the magnetic recording medium as media spreads further, it is required to supply cheaper ones.

Specifically, to provide the high-density recording, it is necessary to enhance the carrier to noise (C/N) ratio of the magnetic recording medium. To this end, it is preferable to smooth the surface of the magnetic layer so as to increase a contact area. On the contrary, the smoothing causes the coefficients of friction between the magnetic layer and the head, between the magnetic layer and the head cylinder and between the magnetic layer and the guide to increase. As a result, the magnetic layer tends to be missed and damaged, the head tends to be contaminated and clogged up or the like.

To prevent the clogging and contamination of the head, conventionally, abrasive material having Mohs' hardness of 8 or more are added to the magnetic layer to abrade the head. However, if the abrasive material are added to the extent that the contamination of the head is prevented, the amount of the abrasion loss (referred to as 'abrasion loss' hereinafter) of the head increases to thereby shorten the service life of a video tape recorder (VTR). Also, if the amount of abrasive material increases, the filling ratio of the magnetic powder decreases and the carrier output of the magnetic layer lowers.

In addition, to reduce the frictional resistance of the tape itself, a lubricant such as a carbon black, organic substance or the like is added to the magnetic layer. This, however, tends to contaminate the head further, decrease the strength of the magnetic coating film or the like. Particularly, this is often prone to inflict, for example, damage on the tape edge of a magnetic tape as the magnetic recording medium which is made thinner to allow long-time recording.

To take these drawbacks into consideration, in the magnetic recording medium required to be smoother and thinner, there has been presently provided a back coating layer including a carbon black as a main component which is coated on the surface of the non-magnetic substrate opposite to that on which the magnetic layer is coated. By doing so, it is intended to ensure running characteristics and, at the same time, attain the smoothing of the surface of the magnetic recording medium and the necessary strength of its coating film.

Nevertheless, even if the back coating layer of this type is provided, the contamination of the head resulting from the smoothing of the surface of the magnetic layer is not completely eliminated in actual.

To overcome these problems, Japanese Patent Application Laid-Open Publication Nos. 61-57036 and 60-93631 disclose magnetic recording media in which the number of abrasive material per the surface of the magnetic layer is specified.

However, they cannot completely avoid the contamination of the head, and decrease its abrasion loss and the running resistance of the magnetic recording medium.

Moreover, Japanese Patent Application Laid-Open Publication No. 6-52541 discloses a magnetic recording medium in which the average height of protrusions of abrasive material is specified to 15 nm or less.

If the average height of the abrasive material is specified to 15 nm, the abrasion ability to the head increases and the contamination of the head can thereby decrease. At the same time, however, the abrasion loss of the head increases accordingly. Besides, while it is possible to clean the sliding portion of the head on which the head is already reaching in its clogged-up state by using another magnetic recording medium, the contamination in the head gap cannot be removed. Additionally, even if the magnetic layer is smoothed, the running resistance of the magnetic recording medium cannot be lowered fully. Without applying a back coating layer, it is hard to ensure the sufficient running durability of the magnetic recording medium.

SUMMARY OF THE INVENTION

As described above, in the conventional magnetic recording medium, even if a back coating layer is provided to satisfy C/N characteristics, running characteristics and durability to realize high-density recording, the problem of the contamination of the head due to the smoothing of the surface of the magnetic layer cannot be fully solved.

Furthermore, in such a case, due to the application of the back coating layer, there is no avoiding increasing production cost compared to the case of applying a single coating layer as the magnetic layer.

That is, it is earnestly desired to ensure improved running characteristics of the magnetic recording medium and improved performance in cleaning the head, to reduce the abrasion loss to the head and to decrease noise without applying a back coating layer for a high-density recording magnetic recording medium.

Meanwhile, regarding the conventional magnetic recording medium without the back coating layer, there is possibility that the increase of light transmittance can not prevent to thereby cause a light detecting sensor, provided for checking the remaining length of the tape set in a VTR or the like, to malfunction.

To prevent this, large amounts of carbon black can be added to a magnetic recording medium without a back coating layer such as a magnetic tape to thereby form a magnetic layer coated on its substrate. This makes it possible to ensure light shielding and/or to make the magnetic coating layer thicker.

Even if a desired light absorption coefficient can be obtained by doing so, not only the carrier output of the magnetic layer may deteriorate and noise may increase but also the magnetic layer itself may be weakened and the contamination of the head may be increased.

Further, by doing so, the strength of the magnetic tape may be lowered, the pressing force of the magnetic tape against the head (so-called head touch) may be lowered, the tape edge may be more damaged due to stress generated between the tape and the tape guide while the head is repeatedly running. They cause preventing the magnetic tape from being thinner for the purpose of realizing long-time recording.

The present invention has been made to solve various problems as stated above. It is, therefore, a first object of the present invention to provide a magnetic recording medium, without providing a back coating layer, capable of exhibiting improved running characteristics so as to prevent deterioration in C/N characteristics, and also exhibiting high efficiency in cleaning a magnetic head to make it possible to clean its head gap in the so-called head clogging state and small head frictional resistance.

It is a second object of the present invention to provide a magnetic recording medium, in addition to attain the above object, even if the magnetic recording medium is a magnetic thinner tape, also having high strength, improved durability and, in particular, exhibiting high linear absorption coefficient with respect to a light at a wavelength of 800 nm.

To obtain the above objects, a magnetic recording medium according to the present invention is provided with a single magnetic layer coated on one surface of a non-magnetic substrate. The thickness of the magnetic layer is not less than 2 $\mu$m. Also, the magnetic layer has protrusions on a plane of a height of 10 nm from a center plane in measurement of surface roughness of the magnetic layer with a density of 5000 to 9000 protrusions/mm$^2$ and has protrusions on a plane of a height of 30 nm from the center plane with a density of 500 to 2000 protrusions/mm$^2$.

Preferably, the magnetic layer includes magnetic powder having a coercive force of 67 to 78 kA/m and a major axis length of 200 to 300 nm.

With such a structure, the magnetic recording medium according to the present invention has quite high efficiency in cleaning the head and improved C/N characteristics without providing a back coating layer. Thus, the magnetic recording medium according to the present invention is suitable for high-density recording and can be manufactured at lower cost.

It is noted that, if the thickness of the coated magnetic layer is thinner than 2 $\mu$m, the surface shape of the base film is transferred onto the surface of the magnetic layer. If the thickness thereof is thicker than 5 $\mu$m, it is hard to maintain the physical strength of the magnetic layer.

In addition, the protrusions on the plane of 10 nm in height greatly contributes to efficiency in cleaning the head sliding surface. In consideration of the balance between the contamination of the head and its abrasion loss, the protrusion density is preferably within the range of 5000 to 9000 protrusions/mm$^2$.

In addition, the magnetic layer has a thickness of not more than 3 $\mu$m and a linear absorption coefficient of 2.2 to 3.5 $\mu m^{-1}$ in case of transmission of a monochromatic light with a wavelength of 800 nm, and the magnetic layer is formed by use of not less than two types of magnetic powders including chromium oxide ($CrO_2$) magnetic powder.

It is preferable that the chromium oxide magnetic powder has a coercive force of 43 to 67 kA/m and a major axis length of 250 to 350 nm.

With the constitution stated above, the magnetic recording medium according to the present invention is further improved in light shielding characteristics with respect to light detection and maintains the improved strength and running characteristics. Thus, the magnetic recording medium according to the present invention is desirable for a long-time recording, thinner magnetic recording medium.

It is noted that, if the magnetic layer is thicker than 3 $\mu$m, the coating powder of the magnetic layer tends to fall off as a result of repeated running.

Furthermore, in a magnetic recording medium without a back coating layer, light shielding characteristics tend to deteriorate to thereby probably induce malfunction at the time of light detection with a view to, for example, checking the remaining length of the tape of the VTR. Owing to this, it is preferable that the magnetic layer includes the chromium oxide magnetic powder contributing to improvement in light shielding characteristics and to ensuring the stability of the coated magnetic layer.

BRIEF DESCRIPTION OF THE DRAWINGS

FIG. 1 is a cross-sectional view of main parts of a magnetic recording medium according to the present invention;

FIG. 2 shows the evaluation results of Examples 1 to 10 of the magnetic recording medium according to the present invention;

FIG. 3 shows the evaluation results of Comparative Examples 1 to 9 of the magnetic recording medium according to the present invention;

FIG. 5 shows the evaluation results of Examples 11 to 20 of the magnetic recording medium according to the present invention; and FIG. 6 shows the evaluation results of Comparative Examples 10 to 21 of the magnetic recording medium according to the present invention.

DESCRIPTION OF THE PREFERRED EMBODIMENTS

Figure 4:
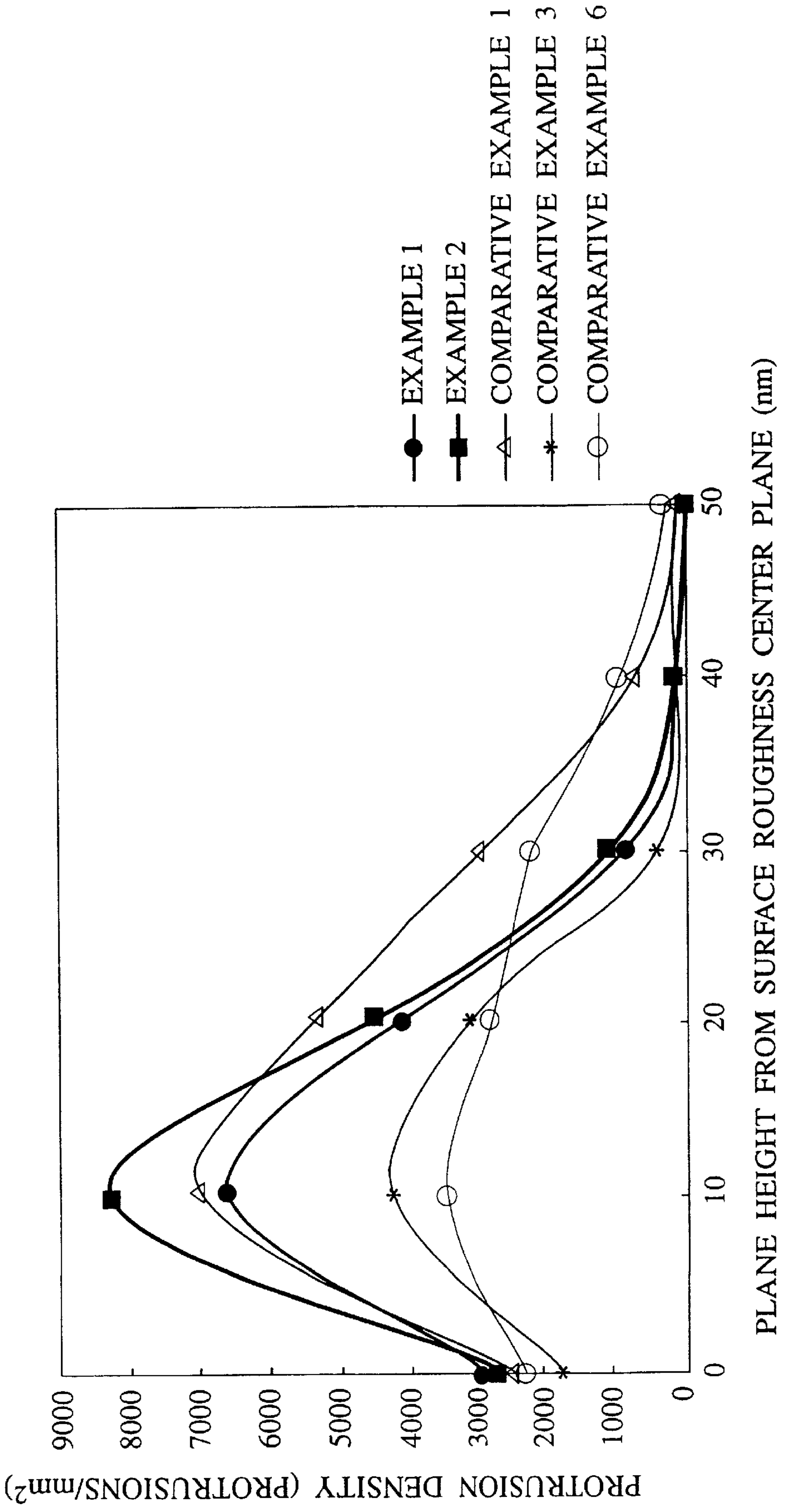
FIG. 4 shows the distribution of each of the protrusion densities of the magnetic surface with respect to the plane height in case of typical Examples and the Comparative Examples of the magnetic recording medium according to the present invention.

While appropriately showing specific examples, the evaluation result of the shape and protrusion density on the surface of a magnetic layer in a magnetic recording medium according to the present invention will be summarized. Next, the evaluation result of the linear absorption coefficient of the magnetic recording medium will be summarized. Accompanying with such summarization, then detailed description will be given to the magnetic recording medium according to the present invention.

(A) First, the shape and protrusion density on the surface of the magnetic layer according to the present invention will be summarized.

FIG. 1 is a cross-sectional view of main parts of the magnetic recording medium according to the present invention. In FIG. 1, a magnetic layer 1 is provided on one surface of a non-magnetic substrate 2.

With respect to such a magnetic recording medium having the magnetic layer coated on one surface of the non-magnetic substrate without a back coating layer provided on the other surface of the substrate, the inventors of the present invention measured and evaluated the states and shapes of protrusions on planes of various heights from the surface roughness center plane of the surface of the magnetic layer using a non-contact type surface roughness measuring device. Based on the measurement and evaluation, the present inventors further continued to be diligently devoted to analyzing the states and shapes of the protrusions. As a result, the inventors reached the following conclusions (i) through (iii).

(i) To specify the convex/concave shape on the surface of the magnetic layer is an essential role in solving the various problems stated above;

(ii) In order to specify the convex/concave shape on the surface of the magnetic layer, it is necessary that the convex/concave shape on the surface are taken as the distribution of the protrusions of the various heights and then to evaluate it based on the numeric density of the protrusions existing on a plane of a specific height; and (iii) The numeric density of the protrusions existing on the plane of the specific height specified by such evaluation is an important parameter having a great influence on the abrasive characteristics of the sliding surface of the head, the efficiency in cleaning the head gap, the frictional resistance of the magnetic layer, the missing of protrusions on the surface of the magnetic layer due to the repeated running, the damage of the magnetic layer surface or the like.

That is to say, it was clear that various problems stated above can be solved only by use of the roughness (i.e. the convex/concave shape) on the surface of the magnetic layer regardless of the composition of the magnetic layer. The numeric density of the protrusions existing on the plane of a predetermined height on the magnetic layer surface is referred to as 'protrusion density' hereinafter.

Here, the evaluation of the surface roughness of the magnetic layer will be described more specifically.

The protrusion density is the numeric density of protrusions crossing the plane having the predetermined height measured form a center plane, which is described below, in the direction perpendicular to the center plane and, in the measurement of the roughness of the magnetic layer surface of the magnetic recording medium according to the present invention, each protrusion density was measured in the following manner. This applies to Examples and Comparative Examples to be described later.

Namely, first, the height distribution of the magnetic layer surface is measured using an optical interference type non-contact three-dimensional surface roughness measurement device and a center plane with respect to a center plane—average roughness SRa is calculated. Thereafter, the number of protrusions crossing the plane of each of predetermined heights from the center plane (which will be referred to as center plane hereinafter) is measured and the distribution of each of the protrusion densities with respect to the corresponding heights is analyzed, whereby the surface roughness of the magnetic layer is evaluated.

Measurement conditions for the optical interference type non-contact three-dimensional surface roughness measurement device are as follows. The used optical interference type non-contact three-dimensional surface roughness measurement device is Maxim3D•5700 (manufactured by ZYGO Corp.), Optical magnification is determined based on an X 40 object lens and FFT (Filter Frequency=12.5 $mm^{-1}$, Filter Wavelength=0.08 mm) is used as a filter.

Protrusions of 10 nm will be studied below.

In the measurement of the surface roughness of the magnetic layer, the density of protrusions existing on a plane of a height of 10 nm from the center plane (which will be referred to as '10 nm protrusions' hereinafter) greatly contributes to the efficiency in cleaning the sliding surface of the head.

Due to this and taking into account of the balance between the contamination of the head and the abrasion loss of the head, the density of 10 nm protrusions is preferably 5000 to 9000 protrusions/$mm^2$, and more preferably 6000 to 8000 protrusions/$mm^2$. If 10 nm protrusion density is less than 5000 protrusions/$mm^2$, it is difficult to clean the contamination of the head sliding surface. If it is more than 9000 protrusions/$mm^2$, the abrasion loss of the head sliding surface considerably increases.

It is also noted that 10 nm protrusions are defined by turning the inventor's attention only to the shape of the magnetic layer surface and not limited to those due to abrasive particles contained in the magnetic layer. They may be formed out of other well-known fillers for the magnetic layer such as magnetic fine powder, carbon black, organic filler or the like.

Namely, it is confirmed that cleaning efficiency with 10 nm protrusions results not from abrasion efficiency as a result of the hardness of the abrasive material but from the shape of the surface. Apparently, this is because the head sliding surface slides in the vicinity of the plane of 10 nm from the center plane in surface roughness measurement depending on the state of contact between the head and the magnetic layer surface and because the contamination on the head sliding surface can be efficiently cleaned without high hardness abrasive protrusions.

Next, 30 nm protrusions will be studied.

In the measurement of the surf ace roughness of the magnetic layer, the density of protrusions existing on a plane of a height of 30 nm from the center plane (which will be referred to as '30 nm protrusions' hereinafter) greatly contributes to efficiency in cleaning the head gap. It also has a great influence on the running characteristics of the tape as the magnetic recording medium without a back coating such as the reduction of the frictional resistance of the magnetic layer surface, the missing of its protrusions during repeated running, the damage to its coating or the like.

Due to this, the density of 30 nm protrusions is preferably 500 to 2000 protrusions/$mm^2$, more preferably 500 to 1000 protrusions/$mm^2$. If 30 nm protrusion density is less than 500 protrusions/$mm^2$, it is hard to clean the contamination of the head gaps and difficult to clean the clogged head due to other tapes. The tape without back coating has a high running resistance to thereby disadvantageously cause the missing of the protrusions, the damage to the magnetic surface layer or the like.

If 30 nm protrusion density is more than 2000 protrusions/$mm^2$, the surface smoothness deteriorates, and the carrier output and C/N ratio decrease. Thus, it is not appropriate for a high-density recording medium at which the present invention is aimed, typically for one using magnetic powder of a coercive force of 67 to 78 kA/m and a major axis length of 200 to 300 nm. In this case, the contact area between the 10 nm protrusions, which cleans the head sliding surface, and the sliding surface considerably decreases. So does deteriorate efficiency in cleaning the head sliding surface considerably.

It is also noted that 30 nm protrusions are, like 10 nm protrusions, not limited to those by use of the abrasive particles. They may be formed out of other well-known fillers for the magnetic layer such as magnetic fine powder, carbon black, organic filler or the like. They may be formed by changing the shape of the coating itself.

Thus, in the magnetic recording medium according to the present invention, it is possible to extract the characteristic shape of the magnetic layer surface using the minimum parameters by specifying the protrusion density of each of the specific heights from the center plane in the measurement of surface roughness of the magnetic layer. Typically, the present invention provides the magnetic recording medium wherein the magnetic powder has a coercive force of 67 to 78 kA/m and its major axis length of 200 to 300 nm, while having the optimum balance among head cleaning efficiency, head abrasion loss and tape running characteristics.

It is noted that in the description of Examples and Comparative Examples to be given later, the specific states of the protrusion shapes on the magnetic layer surface indicated and extracted by 10 nm protrusion density and 30 nm protrusion density will be referred to as the protrusion shape state if necessary.

To realize the surface shape of the present invention, calender processing conditions, particle diameters of abrasive material, quantity of added abrasive material, quantity of added material to the magnetic layer such as carbon black or the like may be appropriately adjusted. However, a method for controlling the surface shape by adding magnetic chromium oxide powder is the most effective method to obtain the strength and running characteristics of the thin tape as the magnetic recording medium without applying the back coating layer.

The thickness of the coated magnetic layer is preferably 2 μm or more, more preferably, 5 μm or less. The reason is as follows. If the thickness of the coated magnetic layer is smaller than 2 μm, the surface shape of a base film as the substrate is transferred onto and superimposed on the surface of the magnetic layer and the significance of specifying the surface shape in the present invention has a less impact. In addition, if the thickness is larger than 5 μm, it is hard to maintain the physical strength of the magnetic layer to thereby cause the occurrence of defects in the coating.

According to the present invention, as for the type of magnetic powder, well-known magnetic powder may be used solely or combined magnetic powders may be used. The coercive force of the magnetic powder is preferably 67 to 78 kA/m and its major axis length is preferably 200 to 300 nm. Specifically, γ-$Fe_2O_3$ (hematite), $Fe_3O_4$ (magnetite) or the like are preferable. Also, the powder added with Co, denatured as desired, doped with a desired substance or the like, may be used, if necessary.

The binder used in the present invention may be selected from well-known binders.

The carbon black used in the present invention may be appropriately selected from well-known carbon black in accordance with the characteristics of the magnetic recording medium at which the present invention is aimed. 2 to 10 weight parts of carbon black is preferable compared to 100 weight parts of the magnetic powder. In case of the carbon black less than 2 weights parts, the electric resistance of the magnetic layer increases and the layer tends to be charged easily, thereby increasing the occurrence of dropout and errors due to deposit substance on the magnetic layer. In case of the carbon black more than 10 weight parts, the strength of the magnetic film coating extremely weakens and the coating is scraped, thereby increasing factors for contaminating the head and deteriorating the tape strength. Thus, the tape edge tends to be damaged during repeated running.

As for the preparation of the magnetic coating material used in the present invention, the magnetic coating material, together with the binder, a known dispersing agent or the like, may be pasted by means of pre-dispersion. Depending on the purpose, of course, the binder, the dispersing agent or the like may be added to the magnetic coating material during a desired step.

As for the abrasive material used in the present invention, well-known material having abrasive function can be used. It is preferable that 3 to 20 weight parts of abrasive material is prepared compared to 100 weight parts of the magnetic powder. In case of the abrasive material more than 20 weight parts, the ratio of magnetic fine powder to the magnetic coating decreases to thereby make it difficult to obtain sufficient magnetic characteristics. In case of abrasive material less than 3 weight parts, the ratio of the rigid filling substance to the magnetic coating decreases to thereby lower the strength of the magnetic layer, thus causing the missing of and damage to the magnetic coating and damage to the tape edge.

In case of adding the carbon black and the abrasive material used in the present invention, the carbon black and the abrasive material together with the binder, a dispersion agent or the like may be pasted by means of pre-dispersion and then may be added to the magnetic coating material during a desired step in the preparation.

As for the lubricant and the dispersion agent used in the present invention, well-known lubricant and dispersion agent may be used freely depending on the purpose.

In the preparation of the magnetic coating material according to the present invention, such well-known methods as mixing, dispersion and agitation may be adopted.

As for the non-magnetic substrate used in the present invention, a well-known video tape film allowing the tape to run without using the back coating may be used.

Now, specific examples of the present invention will be described in detail while appropriately referring to comparative examples and to the drawings. It is noted, however, that the present invention should not be limited to these examples. A protrusion state seen in the following description is intended to indicate the state of a typical protrusion shape on the surface of the magnetic layer indicated and extracted by the 10 nm protrusion density and 30 nm protrusion density.

Examples 1 to 10 and Comparative Examples 1 to 9 relate to the evaluation of the shape and protrusion density on the magnetic layer surface, i.e., the surface roughness of the magnetic layer.

EXAMPLE 1

In example 1, the composition of the magnetic coating material used for the magnetic layer of the magnetic recording medium is as follows.

| Composition of magnetic coating | |
|---|---|
| Magnetic fine powder ($CO—Fe_3O_4$: Coercive force 74 Ka/m, major axis length 250 nm) | 100 weight parts |
| Vinyl chloride copolymer (Nippon Zeon Co. Ltd., MR-100) | 7.5 weight parts |
| Polyester polyurethane resin (Toyobo Co. Ltd., UR8300) | 7.5 weight parts |
| α-alumina | 8 weight parts |
| Carbon black | 5 weight parts |
| Lecithin | 2 weight parts |
| Toluene | 100 weight parts |
| Methyl ethyl ketone | 100 weight parts |
| Cyclohexanone | 100 weight parts |
| Polyisocyanate (Nippon Polyurethane Industry Co. Ltd., coronate 3041) | 5 weight parts |
| Myristic acid | 1.5 weight parts |
| Butyl stearate | 1.5 weight parts |

The above components were prepared, mixed by a sand mill, dispersed and prepared for the magnetic coating material.

Next, while forming the magnetic coating material into a film, conditions for coating the magnetic coating material to the non-magnetic substrate, dry conditions, calendar conditions or the like were adjusted and the convex/concave shape of the magnetic layer surface, i.e., the state of protrusions on the plane of each of the specific heights from the surface roughness center plane was thereby controlled. As for the non-magnetic substrate, a polyethylene terephthalate (PET) film of a thickness of 13 μm was used and the magnetic layer thickness was adjusted to 3 μm.

This film-shaped medium was cut to have a width of 2.65 mm to provide a sample magnetic tape.

The evaluation result of the magnetic tape in this example is shown in FIG. 2.

It is noted that conditions other than those specially specified are the same as in the following Examples 2 to 10 and Comparative Examples 1 to 9. The evaluation results of Examples 2 to 10 are shown in FIG. 2, whereas those of Comparative Examples are shown in FIG. 3.

EXAMPLES 2 to 4

In Examples 2 to 4, the composition of the magnetic layer in Example 1 was used and coating conditions, dry conditions and calender conditions were controlled and the state of protrusions on the plane of each of the specific heights from the surface roughness center plane of the surface of the magnetic layer was thereby controlled.

The following results were obtained. As regards 10 nm protrusion density (to be referred to as 'N10' hereinafter) and 30 nm protrusion density (to be referred to as 'N30' hereinafter), the protrusion shape state in Example 2 showed that both N10 and N30 were high, that is, N10=8300 protrusions/mm$^2$ and N30=1100 protrusions/mm$^2$. The protrusion shape state in Example 3 showed that N30 was high, i.e., N10=7100 protrusions/mm$^2$ and N30=1800 protrusions/mm$^2$. The protrusion shape state in Example 4 showed that N10 was low, that is, N10=5200 protrusions/mm$^2$ and N30=800 protrusions/mm$^2$.

EXAMPLES 5 to 7

In Example 5, the quantity of the added abrasive material α-alumina in the composition of the magnetic layer material shown in Example 1 was reduced to 3 weight parts. In Example 6, the quantity of the added abrasive material α-alumina in the composition of the magnetic layer shown in Example 1 was increased to 20 weight parts. In Example 7, the added abrasive material α-alumina in the composition of the magnetic layer shown in Example 1 was changed to 8 weight parts of $Cr_2O_3$ abrasive material. Thus, the resultant samples were different from Example 1 in the composition of the abrasive material.

EXAMPLES 8 to 10

In Example 8, the magnetic fine powder in the composition of the magnetic layer shown in Example 1 was changed to Co—$Fe_3O_4$ characteristically having a small coercive force Hc of 64 kA/m. In Example 9, the magnetic fine powder in the composition of the magnetic layer shown in Example 1 was changed to Co—$Fe_3O_4$ characteristically having a short major axis length of 150 nm. In Example 10, the magnetic fine powder in the composition of the magnetic layer shown in Example 1 was changed to Co—$Fe_3O_4$ having a long major axis length of 350 nm. Thus, the resultant samples were different from Example 1 in the composition of magnetic fine powder.

Comparative Examples 1 to 6

In Comparative Examples 1 to 6, the composition of the magnetic layer in Example 1 was used and coating conditions, dry conditions and calender conditions were controlled, thereby controlling the state of protrusions on the plane each of the specific heights from the surface roughness center plane on the surface of the magnetic layer. The results are as follows. As regards 10 nm protrusion density and 30 nm protrusion density, Comparative Example 1 showed the protrusion shape state in which N30 was particularly high, i.e., N10=7000 protrusions/mm$^2$ and N30=3000 protrusions/mm$^2$. Comparative Example 2 showed the protrusion shape state in which N10 was particularly high, i.e., N10=10000 protrusions/mm$^2$ and N30=900 protrusions/mm$^2$. Comparative Example 3 showed the protrusion shape state in which both N10 and N30 were low, i.e., N10=4300 protrusions/mm$^2$ and N30=200 protrusions/mm$^2$. Comparative Example 4 showed the protrusion shape state in which N10 was particularly low, i.e., N10=3200 protrusions/mm and N30=1100 protrusions/mm$^2$. Comparative Example 5 showed the protrusion shape state in which N30 was particularly low, i.e., N10=7000 protrusions/mm$^2$ and N30=300 protrusions/mm$^2$. Comparative Example 6 showed the protrusion shape state in which N10 was low and N30 was high, i.e., N10=3500 protrusions/mm$^2$and N30=2200 protrusions/mm$^2$.

Comparative Examples 7 and 8

In Comparative Example 7, the quantity of the added abrasive material α-alumina in the composition of the magnetic layer shown in Example 1 was greatly increased to 40 weight parts. In Comparative Example 8, the quantity of the added abrasive material α-alumina in the composition of the magnetic layer shown in Example 1 was greatly decreased to 1 weight part. Thus, the resultant samples were different from Example 1 in the composition of abrasive material.

Comparative Example 9

In Comparative Example 9, the composition of the magnetic layer in Example 10 was used and coating conditions, dry conditions and calender conditions were controlled, thereby obtaining the protrusion shape state in which N10 was low and N30 was high.

<<Characteristic Evaluation 1>>

Methods for evaluating respective characteristics are shown below.

(1) As regards protrusion density on a plane of each of specific heights:

The numeric density of the protrusions on the plane of each of heights of 10 nm and 30 from the center plane was measured, respectively, with the above-stated optical interference type non-contact three-dimensional surface roughness measuring device and was analyzed. The measurement conditions for the optical interference type non-contact three-dimensional surface roughness measuring device are described above.

(2) As regards carrier output and C/N ratio at a frequency of 6.5 $MH_z$:

In the measurement of 6.5 $MH_z$ carrier output and the C/N ratio, a S-VHS videocassette recorder (Victor Co. of Japan, Ltd.: BR-S611) was used and the output of sine wave at a frequency of 6.5 $MH_z$ and the noise at a frequency of 5.5 $MH_z$ were measured. The carrier output and the C/N ratio were obtained by using relative values with respect to the S-VHS reference tape.

(3) As regards the contamination on the head sliding surface:

In the measurement of the contamination on the head sliding surface, a videocassette recorder (Victor Co. of Japan, Ltd.: BR-7000) was used. The contamination on the head after continuously running for 100 hours in the environment that temperature was 40° C. and relative humidity was 80%, was observed by means of a microscope. Depending on the ratio of the contaminated area, evaluation was made as follows:

◎: No contamination on the head sliding surface is seen.

○: The area of contamination on the head sliding surface is within 5%.

Δ: The area of contamination on the head sliding surface is within 20%.

×: The area of contamination on the head sliding surface is above 20%.

(4) As regards head clogging recovery time:

In the measurement of the head clogging recovery time, a videocassette recorder (Victor Co. of Japan, Ltd.: BR-7000) was used. After the head was completely clogged up by a tape which tends to cause the head clogging in advance, an evaluation tape was run at a room temperature. Running time until the head clogging was eliminated and FM output was recovered into an initial state was measured.

(5) As regards head abrasion loss:

In the measurement of the head abrasion loss, a videocassette recorder (Victor Co. of Japan, Ltd.: BR-7000) was used. The head abrasion loss after the tape was allowed to continuously run for 100 hours in the environment that temperature was 40° C. and relative humidity was 80% was measured.

(6) As regards dynamic friction coefficient:

The dynamic friction coefficient was obtained while sliding the head on a guide formed by SUS material in a cassette half at a setting angle of 180°, a load of 10 gf, and a speed of 2 m/min.

(7) As regards ΔD/O after running on 500 path:

In the measurement of ΔD/O (D/O change quantity) after the tape was allowed to run on 500 path, a videocassette recorder (Victor Co. of Japan, Ltd.: BR-7000) was used. ΔD/O at time of 15 μs and an FM change quantity of −16 dB before and after the tape was allowed to run 500 times repeatedly in the environment that temperature was 20° C. and relative humidity of 60% was measured.

Now, description will be given to the evaluation results stated above.

FIG. 4 shows the distribution of each of the densities of protrusions on the surface of the magnetic layer in typical examples and comparative examples with respect to plane heights. FIG. 2 shows the measurement results of the respective examples and FIG. 3 shows the measurement results of the respective comparative examples.

First, as regards N10, efficiency in cleaning the head sliding surface deteriorated and clogging recovery time was long in, for instance, Comparative Example 4 in which N10 was the lowest. In Comparative Example 2 in which N10 was high, by contrast, cleaning efficiency was good but head abrasion loss was large so that it was not practical.

Judging from other examples and comparative examples, it is understood that N10 preferably falls within the range of 5000 to 9000 protrusions/mm$^2$ so as to realize appropriate cleaning efficiency.

Next, as for N30, head clogging was not eliminated in, for instance, Comparative Example 5 in which N30 was low. Surface smoothness was deteriorated to thereby induce deterioration in C/N ratio and the contamination on the head sliding surface in, for instance, Comparative Example 1 in which N30 was high.

Thus, judging from other examples and comparative examples, it is understood that N30 preferably falls within the range of 500 to 2000 protrusions/mm$^2$ in order to realize appropriate cleaning characteristics, running characteristics or the like.

Taking Example 1 and Examples 5 and 7, for instance, Examples 5 and 7 differed from Example 1 in the composition of the abrasive material. They, however, showed almost the same protrusion shape state and also good C/N characteristics and cleaning efficiency. On the other hand, Example 10 and Comparative Example 9 were the same in the composition of the magnetic layer but differed in the protrusion shape state. They also greatly differed from each other in C/N characteristics and cleaning characteristics.

These results substantiate that it is of significance to the characteristics of the magnetic recording medium to specify the protrusion shape state on the surface of the magnetic layer using N10 and N30 as mentioned above and also substantiates the validity to specify so.

Evidently, therefore, it is possible to provide a magnetic recording medium having sufficient efficiency in cleaning the head sliding surface and the head gap, fully reduced head abrasion loss and sufficient output C/N characteristics by specifying the heights from the surface roughness center plane of the magnetic layer to 10 nm and 30 nm so as to specify and adjust the protrusion densities on the planes of the respective heights. Further, it will be understood that running characteristics is quite improved in a case of the tape structure in which no back coating is applied.

Now, if Example 1 is compared with Examples 9 and 10, then it is understood that the major axis length of magnetic fine powder was from 150 nm to 350 nm, the protrusion shape states fell within the specified range as stated above and that the magnetic recording characteristics and cleaning efficiency kept appropriate balance. In Example 8, since the magnetic fine powder having a small coercive force (Hc=64 kA/m) was used, the protrusion shape state was the same as that of Example 1 and thus the characteristic requirements as above stated were satisfied but C/N characteristics was naturally lower than in Example 1.

Hence, it is possible to provide an optimum tape compliant with the respective characteristics of, for instance, S-VHS by preferably using the magnetic fine powder having the coercive force of 67 to 78 kA/m and the major axis length of 200 to 300 nm in the magnetic layer.

(B) Next, the linear absorption coefficient of the magnetic recording medium according to the present invention will be summarized.

The present invention provides the magnetic recording medium capable of having improved tape running characteristics and having improved cleaning efficiency without doing damage to C/N characteristics, even if the back coating layer is not provided.

It is also true, however, as already mentioned, that in the magnetic recording medium without the back coating layer, it is difficult to compensate for a reduction in light transmittance and the sensor tends to malfunction while, for example, optically sensing the remaining length of the VTR tape.

Considering such a drawback, the present inventor was further dedicated to studies in this aspect, and found out as follows. The magnetic recording medium wherein a magnetic layer is formed by use of at least two types of magnetic powders, at least one of the magnetic powders being chromium oxide ($CrO_2$) has a high linear absorption coefficient for a light with a wavelength of 800 nm, reduces the quantity of carbon black and abrasive material added to the magnetic layer, prevents the coating film from weakening, provides a magnetic tape as the magnetic recording medium with high strength and has sufficient durability of the thinner tape.

The magnetic powder other than the chromium oxide magnetic powder has preferably a coercive force of 67 to 78 kA/m and a major axis length of 200 nm to 300 nm for, in particular, realizing high-density recording, as described in (A) above with regard to the shape and protrusion density of the magnetic layer surface.

In addition, it is preferable that the coercive force of the magnetic chromium oxide powder is 43 to 67 kA/m and the major axis length thereof is 250 to 350 nm. This is because the advantage of increasing the strength of the magnetic layer as the coating film is decreased if the major axis length of the magnetic chromium oxide is smaller than 250 nm and the noise increases if the length thereof is larger than 350 nm. Thus, it is not suited for a high-density magnetic recording medium at which the present invention is aimed at. The weight percentage of the magnetic chromium oxide powder in the overall magnetic powders is preferably 5 to 35%. If it is less than 5 wt %, the above-stated advantage decreases and if it is more than 35 wt %, output C/N ratio suited for a high-density magnetic recording medium, at which the present invention is aimed, cannot be attained.

The measurement of the linear absorption coefficient of the magnetic layer of the magnetic recording medium according to the present invention was conducted in the following manner.

While description being given typically to a case in which the magnetic recording medium is a tape-shaped medium, the transmittance of the tape by use of a light having a wavelength in the range between 780 to 820 nm was measured using a magnetic spectrophotometer (manufactured by HITACHI: Spectrophotometer 330). The transmittance of a light with a wavelength of 800 nm was obtained and converted into light absorption rate and then the linear absorption coefficient was calculated using the following formula:

$$\mu(\mu m^{-1})=(-\ln(A_{800}/100))/H(\mu m)$$

Here, $\mu$ is the linear absorption coefficient ($\mu m^{-1}$), $A_{800}$ is the light absorption rate of the light with the wavelength of 800 (nm) and H ($\mu$m) is the thickness of the magnetic layer.

In the magnetic recording medium according to the present invention, the magnetic layer contains two types or more magnetic powders including chromium oxide ($CrO_2$) magnetic powder. By using two types or more of magnetic powders with one type thereof being chromium oxide magnetic powder, it is possible to adjust the number of protrusions on the planes of heights of 10 nm and 20 nm, respectively. Further, by introducing the chromium oxide magnetic powder, it is possible to enhance the elasticity of the magnetic film coating indicated by use of such as Young's modulus due to the major axis length of the chromium oxide magnetic powder, and to provide the magnetic tape with stable and long-time light shielding characteristics due to high light shielding characteristics and long-time stability of the chromium oxide magnetic powder.

As a result, it is possible to considerably reduce the quantity of the carbon black and the abrasive material added to the magnetic layer. Besides, this can contribute to enhancement in the tape strength to thereby make it possible to provide a high-density, long-time and thinner tape as the magnetic recording medium without the back coating.

To realize the shape surface of the magnetic layer of the magnetic recording medium according to the present invention, any methods in which the adjustment of the calender processing conditions, the particle diameters of the abrasive material, the quantity of the additive, the kind of the additive such as carbon black added to the magnetic layer or the like is performed may be used. The method for controlling the surface shape by the quantity of the added chromium oxide magnetic powder is most effective to provide a thinner tape with high strength and sufficient running characteristics without the need to apply the back coating layer as the magnetic recording medium.

Additionally, as described in (A) above with regard to the shape and protrusion density on the surface of the magnetic layer, the thickness of the magnetic layer applied to the magnetic recording medium according to the present invention is preferably 2 $\mu$m or more, more preferably, 3 $\mu$m or less. This is because the physical properties of the tape get ill-balanced due to the difference in physical strength between the magnetic layer and the base film as the substrate and because the coating powder in the magnetic layer tends to easily fall off due to repeated tape running if the thickness is larger than 3 $\mu$m.

As for magnetic powder other than the chromium oxide magnetic powder in the magnetic layer of the magnetic recording medium, well-known magnetic powder may be used. The magnetic powder preferably has the coercive force of 67 to 78 kA/m and its major axis length of 200 nm to 300 nm as described in item (A) above with regard to the shape and protrusion density on the surface of the magnetic layer. More preferably, the powder is $\gamma$-$Fe_2O_3$ and $Fe_3O_4$ or the like. Also, Co may be added to the powder, the powder may be denatured as desired or doped with a desired substance, if necessary.

As for the manufacturing method and type of chromium oxide magnetic powder in the magnetic layer of the magnetic recording medium according to the present invention, well-known method and type can be used. As described above, the chromium oxide magnetic powder preferably has the coercive force of 43 to 67 kA/m and its major axis length of 250 to 350 nm. The ratio of the chromium oxide magnetic powder to the overall powders is preferably 5 to 35 wt %.

Examples 11 to 20 and Comparative Examples 10 to 21 relate to the evaluation of the linear absorption coefficient of the magnetic recording medium. The measurement results as well as the evaluation results of protrusion shape states in these examples are shown in FIG. 5, whereas the measurement results as well as the evaluation results of protrusion shape states in these comparative examples are shown in FIG. 6. The measurement of protrusion shape states or the like common to the Examples 1 to 10 and Comparative Examples 1 to 9 was made in the same manner.

EXAMPLE 11

In Example 11, magnetic coating having the following composition was prepared for the magnetic layer.

| Composition of magnetic coating | |
|---|---|
| Magnetic fine powder 1 ($Co$—$Fe_3O_4$: Coercive force 74 kA/m, major axis length 250 nm) | 100 weight parts |
| Magnetic fine powder 2 ($CrO_2$: Coercive force 50 kA/m, major axis length 290 nm) | 20 weight parts |
| Vinyl chloride copolymer (Nippon Zeon Co. Ltd., MR-110) | 7.5 weight parts |
| Polyester polyurethane resin (Toyobo Co. Ltd. UR8300) | 7.5 weight parts |
| α-alumina | 8 weight parts |

-continued

| Composition of magnetic coating | |
|---|---|
| Carbon black | 5 weight parts |
| Lecithin | 2 weight parts |
| Toluene | 100 weight parts |
| Methyl ethyl ketone | 100 weight parts |
| Cyclohexanone | 100 weight parts |
| Polyisocyanate (Nippon Polyurethane Industry Co. Ltd., coronate 3041) | 5 weight parts |
| Myristic acid | 1.5 weight parts |
| Butyl stearate | 1.5 weight parts |

The above components were prepared, mixed by a sand mill, dispersed and then prepared for a magnetic coating material.

Thereafter, while forming a film-shaped magnetic recording medium by forming a magnetic layer by use of the magnetic coating material, conditions for coating the magnetic coating material to a non-magnetic substrate, dry conditions, calender conditions or the like were adjusted and the states of protrusions on the plane of each of specific heights from the surface roughness center plane were thereby controlled, respectively.

As for the non-magnetic substrate, a polyethylene terephthalate (PET) film of a thickness of 11 $\mu$m was used and to the magnetic layer thickness was adjusted to 2.2 $\mu$m.

This film-shaped medium was then cut to have a width of 2.65 mm to provide a sample magnetic tape.

Conditions, other than those particularly specified, in the following Examples 12 to 20 and Comparative Examples 10 to 21 were the same as those in Example 11.

EXAMPLES 12 and 13

In Example 12, the quantity of the added magnetic chromium oxide in the composition of the magnetic layer shown in Example 11 was reduced to 5 weight parts. In Example 13, the quantity of the added magnetic chromium oxide in the composition of the magnetic layer shown in Example 11 was increased to 35 weight parts. Thus, the resultant samples were different from Example 11 in the quantity of the added magnetic chromium oxide.

EXAMPLES 14 to 16

In Example 14, the quantity of the added abrasive material $\alpha$-alumina in the composition of the magnetic layer shown in Example 11 was reduced to 3 weight parts. In Example 15, the quantity of the added abrasive material $\alpha$-alumina in the composition of the magnetic layer shown in Example 11 was increased to 20 weight parts. In Example 16, the abrasive material $\alpha$-alumina in the composition of the magnetic layer shown in Example 11 was changed to 8 weight parts of $Cr_2O_3$ abrasive material. Thus, the resultant samples were different from Example 11 in the composition of abrasive material.

EXAMPLES 17 and 18

In Example 17, the magnetic fine powder 2 in the composition of the magnetic layer shown in Example 11 was changed to magnetic chromium oxide powder having a large coercive force Hc of 67 kA/m. In Example 18, the magnetic fine powder 2 in the composition of the magnetic layer shown in Example 11 was changed to magnetic chromium oxide powder having a small coercive force Hc of 43 kA/m. Thus, the samples containing magnetic fine powder 2 of different coercive force were obtained.

EXAMPLES 19 and 20

In Example 19, the major axis length of the magnetic fine powder 2 in the composition of the magnetic layer shown in Example 11 was changed to be as large as 350 nm. In Example 20, the major axis length of the magnetic fine powder 2 in the composition of the magnetic layer shown in Example 11 was changed to be as small as 250 nm. Thus, the samples containing magnetic fine powders having different lengths were obtained.

Comparative Examples 10 to 12

In Comparative Examples 10 to 12, the composition of the magnetic layer in Example 11 was used and coating conditions, dry conditions and calender conditions were controlled, thereby controlling the states of protrusions on the plane of each of the specific heights from the surface roughness center plane of the surface of the magnetic layer, respectively. The results are as follows. As regards 10 nm protrusion density and 30 nm protrusion density, Comparative Example 10 showed the protrusion shape state in which N30 was particularly high. Comparative Example 11 showed the protrusion shape state in which N10 was particularly high. Comparative Example 12 showed the protrusion shape state in which both N10 and N30 were low.

Comparative Examples 13 and 14

In Comparative Example 13, the quantity of the added abrasive material $\alpha$-alumina in the composition of the magnetic layer shown in Example 11 was greatly increased to 40 weight parts. In Comparative Example 14, the quantity of the added abrasive material $\alpha$-alumina in the composition of the magnetic layer shown in Example 11 was greatly decreased to 1 weight part. Thus, resultant samples were different from Example 11 in the composition of abrasive material.

Comparative Examples 15 to 17

In Comparative Example 15, the magnetic fine powder 2 in the composition of the magnetic layer shown in Example 11 was changed to magnetic chromium oxide having an extremely small coercive force of 3.6 kA/m and a major axis length of 250 nm. In Comparative Example 16, the magnetic fine powder 2 in the composition of the magnetic layer shown in Example 11 was changed to magnetic chromium oxide having an extremely small coercive force of 5 kA/m and an extremely long major axis length of 450 nm. In Comparative Example 17, the magnetic fine powder 2 in the composition of the magnetic layer shown in Example 11 was changed to magnetic chromium oxide having an extremely small coercive force of 5 kA/m and an extremely short major axis length of 150 nm. Thus, the samples containing magnetic fine powder 2 with different coercive force and different major axis lengths were obtained.

Comparative Example 18

In Comparative Example 18, the composition of the magnetic layer in Example 11 was used and the quantity of added magnetic chromium oxide was greatly increased to 45 weight parts to thereby obtain a sample.

Comparative Examples 19 to 21

In Comparative Examples 19 to 21, the quantity of the added magnetic chromium oxide in the composition of the magnetic layer shown in Example 11 was reduced to 0 weight part. Coating conditions for applying the magnetic layer onto the non-magnetic substrate, dry conditions, calender conditions or the like were adjusted, thereby controlling the states of protrusions on the plane of each of the specific heights from the surface roughness center plane of the surface of the magnetic layer, respectively. As a result, the protrusion shape states evaluated based on 10 nm protrusion density N10 and 30 nm protrusion density N30 of Comparative Examples 19 showed the same as in Example 11. Further, Comparative Example 20 showed the protrusion shape state in which N30 was particularly high. Comparative Example 21 showed the protrusion shape state in which N10 was particularly high.

<<Characteristic Evaluation 2>>

In this characteristic evaluation, methods for evaluating respective characteristics with respect to the same items as in Characteristic Evaluation 1 are the same as in Characteristic Evaluation 1.

(1) As regards the light transmittance of the tape and the linear absorption coefficient of the magnetic layer:

Transmittance of the light having the wavelength in the range of 780 to 820 nm was measured with respect to the respective tape samples using a magnetic spectrophotometer (manufactured by HITACHI; Spectrophotometer 330). The transmittance of the light having the wavelength of 800 nm was then obtained and the linear absorption coefficient was calculated using the above-stated mathematical forumela.

(2) As regards tape edge damage after tape running on 500 path:

A videocassette recorder (Victor Co. of Japan, Ltd. BR-7000) was used and the tape edge damages before and after the tape repeatedly ran 500 times in the environment that temperature was 20° C. and relative humidity was 60%, were observed. Here, the damage levels were classified as follows and evaluation was made.

◎: No edge damage is seen.

○: Although it is recognized that edge damage occurred slightly, picture and sound are not influenced.

Δ: It is recognized that normal sound output decreases by −6 dB or more.

×: It is recognized that there is large noise in video pictures.

FIG. 5 shows the evaluation results of the typical examples of the magnetic recording medium according to the present invention. FIG. 6 shows the evaluation results of the respective comparative examples.

Although the composition of the magnetic layer differs from that in a case of the surface roughness evaluation of the magnetic layer stated above, Examples 14 to 16 correspond to Examples 5 to 7 and Comparative Examples 10 to 12 correspond to Comparative Examples 1 to 3.

Based on the evaluation results of Characteristic Evaluation 2, similarly as described in Characteristic Evaluation 1, it was confirmed that the specified characteristics can be satisfied only by use of the surface shape of the magnetic layer in which N10 and N30 are respectively specified such that N10 is in the range of 5000 to 9000 protrusions/mm$^2$ and N30 is in the range of 500 to 9000 protrusions/mm$^2$.

Next, as for the linear absorption coefficient, it was understood that the coefficient was low and edge was heavily damaged in Comparative Examples 19 to 21 in which the magnetic layer did not contain magnetic chromium oxide.

On the other hand, all of the specified characteristics were satisfied in Example 12 in which the magnetic chromium oxide powder was reduced to 5 weight parts.

Thus, it can be said that the magnetic layer needs to contain the chromium oxide powder in order to satisfy light shielding characteristics. Moreover, if the thickness of the magnetic layer is small, the tape does not exhibit sufficient elasticity. However, it was made clear that sufficient elasticity was given to the tape if the magnetic chromium oxide was contained in the magnetic layer.

Further, as for the coercive force of the magnetic chromium oxide powder, if Examples 17 and 18 are compared with Example 11, Examples 17 and 18 showed the same protrusion shape state as that of Example 11 and showed cleaning efficiency as expected. Besides, even if the coercive force Hc was as small as 43 kA/m as shown in Example 18, characteristic evaluation was the same as that of Example 11.

In addition, as for the major axis length of the magnetic chromium oxide powder, Examples 19 and 20 are compared with Example 11. It is then understood that good characteristic evaluation was obtained if the major axis length falls within the range of 250 to 350 nm from the viewpoints of equally obtaining the smoothness, the cleaning efficiency and the mechanical strength all of which have significant effects on magnetic recording. The reason is as follows. If the major axis is shorter than 250 nm, the advantage of improving the coating strength of the magnetic layer decreases. If the major axis is longer than 350 nm, noise increases and C/N ratio deteriorates, meaning that the medium is not suited for high-density magnetic recording.

As can be understood from the above, it is preferable that the magnetic layer includes the chromium oxide powder and that the chromium oxide powder has the coercive force of 43 to 67 kA/m and the major axis length of 250 to 350 nm.

The magnetic recording medium without the back coating layer according to the examples of the present invention has, therefore, such characteristics that C/N characteristics does not deteriorate, efficiency in cleaning the magnetic head is high, and that the head gap can be cleaned even if the head is clogged up and the head abrasion is small. Additionally, it can be understood that light shielding characteristics is ensured while keeping a high linear absorption coefficient for the light with the wavelength of 800 nm, and that the tape, although being thinner, can exhibit sufficient strength and tape running characteristics.

What is claimed is:

1. A magnetic recording medium, comprising:

a non-magnetic substrate; and a single magnetic layer coated on one surface of said non-magnetic substrate, said magnetic layer having a thickness of not less than 2 μm, having protrusions on a plane of a height of 10 nm from a center plane in measurement of surface roughness of said magnetic layer with a density of 5000 to 9000 protrusions/mm$^2$ and having protrusions on a plane of a height of 30 nm from said center plane with a density of 500 to 2000 protrusions/mm$^2$.

2. A magnetic recording medium according to claim 1, wherein said magnetic layer includes magnetic powder having a coercive force of 67 to 78 kA/m and a major axis length of 200 to 300 nm.

3. A magnetic recording medium according to claim 1, wherein said magnetic layer has a thickness of not more than 3 μm and a linear absorption coefficient of 2.2 to 3.5 $\mu m^{-1}$ in case of transmission of a light with a wavelength of 800 nm, and said magnetic layer is formed by use of not less than two types of magnetic powders including chromium oxide magnetic powder.

4. A magnetic recording medium according to claim 3, wherein said chromium oxide magnetic powder has a coercive force of 43 to 67 kA/m and a major axis length of 250 to 350 nm.

* * * * *